J. ROW.
WAGON BRAKE.

No. 38,697. Patented May 26, 1863.

Witnesses:
J. W. Coombs
G. W. Reed

Inventor:
John Rowe
per Munn & Co.
Attorneys

UNITED STATES PATENT OFFICE.

JOHN ROW, OF MANTORVILLE, MINNESOTA.

IMPROVEMENT IN WAGON-BRAKES.

Specification forming part of Letters Patent No. 38,697, dated May 26, 1863.

*To all whom it may concern:*

Be it known that I, JOHN ROW, of Mantorville, in the county of Dodge and State of Minnesota, have invented a new and Improved Wagon-Brake; and I do hereby declare that the following is a full, clear, and exact description of the same, reference being had to the accompanying drawings, forming a part of this specification, in which—

Figure 1:
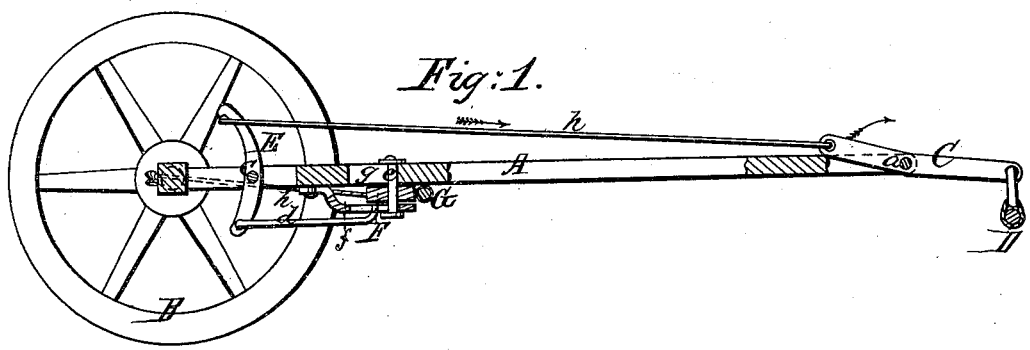
Figure 2:
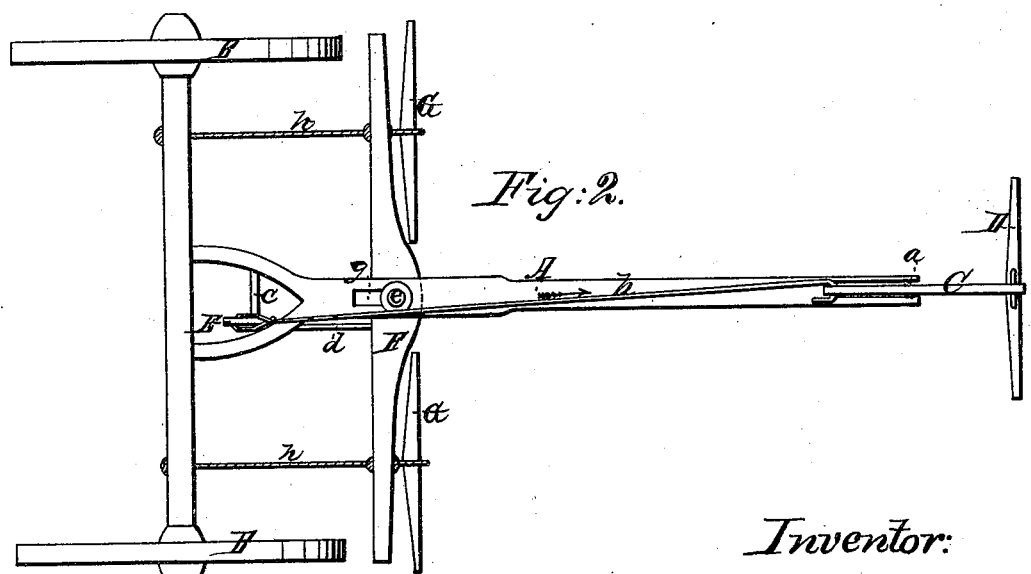

Figure 1 represents a longitudinal vertical section of my invention. Fig. 2 is a plan or top view of the same.

Similar letters of reference indicate corresponding parts in both views.

This invention consists in the arrangement of a hinged lever on the front end of the tongue or draft-pole, said lever to connect at one end with the holdback-straps, and at the other with a lever which is fulcrumed on a pin at the rear end of the draft-pole, and which acts upon the sliding brake-bar in such a manner that whenever the animals exert a backward strain on the draft-pole the brakes are applied to the wheels, and the motion of the wagon or vehicle is retarded.

To enable others skilled in the art to make and use my invention, I will proceed to describe it.

A represents the tongue or draft-pole of a wagon or vehicle, said pole extending from the axle of the wheels B in the ordinary manner. C is a lever, which has its fulcrum on a pin or pivot, $a$, in the front end of the draft-pole. The outer end of this lever connects with the holdback-straps of the draft animals, which may either be attached to a small whiffletree, D, suspended from said lever, or which may be secured to the same in any other convenient manner. The inner end of the lever C connects by a rod, $b$, with the upper end of a lever, E, which has its fulcrum on a rod or pin, $e$, in the rear end of the draft-pole, near to the axle of the wheels B. The lower end of this lever connects by a rod, $d$, with the brake-bar F, which is suspended from a pivot, $e$, under the draft-pole, being supported by a bracket, $f$, which is firmly secured to the draft-pole, as clearly shown in Fig. 1 of the drawings. The pivot $e$ has a longitudinal motion in a slot, $g$, in the draft-pole, and a corresponding slot in the bracket $f$, and if a strain is exerted on the rod $b$, in the direction of the arrow marked near it in the drawings, the brake-bar is drawn up toward the wheels, and the brakes are applied. The draft-animals are hitched to whiffletrees G, suspended from the brake-bar $f$ on opposite sides of the draft-pole, as clearly shown in Fig. 2, so that when the wagon or vehicle is drawn forward the strain exerted by the draft-animals causes the brake-bar to move toward the front end of the draft-pole, and the brakes are taken off. Chains $h$ or other suitable devices serve to equalize the strain and to prevent the application of the brake on one wheel in case one of the draft-animals should pull harder than the other. If the wagon or vehicle crowds on the draft-animals, or whenever a strain is exerted on the holdback-straps in a backward direction, the lever C swings up in the direction of the arrow marked near it in Fig. 1, and by this action a strain is exerted on the lever E, and the brakes are applied. It is obvious that the power with which the brakes are applied depends entirely upon the power of the backward strains of the draft-animals, and as soon as this strain ceases and the draft-animals begin to exert a forward strain on the traces the brakes are taken off spontaneously. When the brakes are not required, a plug may be inserted behind the pivot into the slot $g$.

What I claim as new, and desire to secure by Letters Patent, is—

The arrangement of the lever C, hinged to the front end of the draft-pole A, and connecting with the holdback-straps, in combination with the hinged lever E, draft-chains H H, and sliding brake F, constructed and operating in the manner and for the purpose substantially as specified.

JOHN ROW.

Witnesses:
  GEO. H. SLOCUM,
  M. I. PIERCE.